United States Patent
Kim et al.

(10) Patent No.: US 9,327,704 B2
(45) Date of Patent: May 3, 2016

(54) SYSTEM AND METHOD FOR CONTROLLING ENGINE CLUTCH DELIVERY TORQUE OF HYBRID ELECTRIC VEHICLE

(71) Applicant: Hyundai Motor Company, Seoul (KR)

(72) Inventors: Sang Joon Kim, Seoul (KR); Tae Woo Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 281 days.

(21) Appl. No.: 14/057,928

(22) Filed: Oct. 18, 2013

(65) Prior Publication Data

US 2014/0148306 A1   May 29, 2014

(30) Foreign Application Priority Data

Nov. 23, 2012   (KR) .................. 10-2012-0133817

(51) Int. Cl.
*B60W 20/00* (2006.01)
*B60W 10/02* (2006.01)
*B60W 30/188* (2012.01)

(52) U.S. Cl.
CPC ............... *B60W 10/02* (2013.01); *B60W 20/00* (2013.01); *B60W 20/10* (2013.01); *B60W 20/1084* (2013.01); *B60W 20/40* (2013.01); *B60W 30/1884* (2013.01); *B60W 2710/026* (2013.01); *Y02T 90/34* (2013.01); *Y10S 903/902* (2013.01); *Y10T 477/26* (2015.01)

(58) Field of Classification Search
None
See application file for complete search history.

(56) References Cited

U.S. PATENT DOCUMENTS

| | | | | |
|---|---|---|---|---|
| 6,026,921 A * | 2/2000 | Aoyama | ............... | B60K 6/48 123/348 |
| 6,740,002 B1 * | 5/2004 | Stridsberg | ............... | B60K 6/405 475/5 |
| 2009/0234524 A1 * | 9/2009 | Kim | ............... | B60K 6/48 701/22 |
| 2011/0313602 A1 * | 12/2011 | Hirata | ............... | B60K 6/365 701/22 |

FOREIGN PATENT DOCUMENTS

| | | |
|---|---|---|
| JP | 2012086596 A | 5/2012 |
| JP | 2012086702 A | 5/2012 |
| KR | 101047399 B1 | 7/2011 |

* cited by examiner

*Primary Examiner* — Colby M Hansen
(74) *Attorney, Agent, or Firm* — McDermott Will & Emery LLP

(57) ABSTRACT

A system and method for controlling engine clutch delivery torque of a hybrid electric vehicle when the engine clutch delivery torque is learned includes: an engine clutch configured to control power transmission between an engine and a motor; an integrated starter-generator (ISG) configured to start the engine or to generate electric power by output of the engine; a transmission configured to change power applied to wheels; and a controller configured to control the engine, the motor, the integrated starter-generator, and the engine clutch in a predetermined condition and to check their states under the predetermined condition, wherein while learning the engine clutch delivery torque, the controller operates and controls the integrated starter-generator in order for the engine to maintain an idle speed when the idle speed is varied above a predetermined value.

4 Claims, 4 Drawing Sheets

SYSTEM AND METHOD FOR CONTROLLING ENGINE CLUTCH DELIVERY TORQUE OF HYBRID ELECTRIC VEHICLE

CROSS-REFERENCE TO RELATED APPLICATION

This application claims priority to and the benefit of Korean Patent Application No. 10-2012-0133817 filed in the Korean Intellectual Property Office on Nov. 23, 2012, the entire contents of which are incorporated herein by reference.

BACKGROUND

1. Technical Field

The present disclosure relates to a system and a method for controlling engine clutch delivery torque of a hybrid electric vehicle. More particularly, the present disclosure relates to a system and a method which maintains engine speed of a predetermined speed, such as an idle speed, and controls operation of an integrated starter-generator so that the integrated starter-generator may generate the engine clutch delivery torque according to hydraulic pressure of the engine clutch when an engine clutch delivery torque is learned, so that engine booming does not occur and noise, vibration, and harshness (NVH) is reduced.

2. Background

Hybrid electric vehicles operate through the use of power from an internal combustion engine and power from a battery. In particular, hybrid electric vehicles are designed to efficiently combine and use power of the internal combustion engine and the motor.

For example, as illustrated in FIG. 1, a hybrid electric vehicle includes an engine 10, a motor 20, an engine clutch 30, a transmission 40, a differential gear unit 50, a battery 60, an integrated starter-generator (ISG) 70, and wheels 80. The engine clutch 30 controls power between the engine 10 and the motor 20, and the ISG 70 starts the engine 10 or generates electric power by output of the engine 10.

As further shown, the hybrid electric vehicle includes a hybrid control unit (HCU) 200 which controls overall operation of the hybrid electric vehicle; an engine control unit (ECU) which controls operation of the engine 10; a motor control unit (MCU) 120 which controls operation of the motor 20; a transmission control unit (TCU) 140 which controls operation of the transmission 40; and a battery control unit (BCU) 160 which manages and controls the battery 60.

The battery control unit 160 may also be referred to as a battery management system (BMS). In the vehicle industry, the ISG 70 may also be referred to as a starting/generating motor or a hybrid starter & generator.

The hybrid electric vehicle may run in a driving mode, such as an electric vehicle (EV) mode using only power of the motor 20, a hybrid electric vehicle (HEV) mode using torque of the engine 10 as main power and torque of the motor 20 as auxiliary power, and a regenerative braking (RB) mode during braking or when the vehicle runs by inertia. In the RB mode, braking and inertia energy are collected through power generation of the motor 20, and the battery 60 is charged with the collected energy.

In particular, the hybrid electric vehicle may run in one mode among the HEV mode, EV mode, and RB mode, by engaging or disengaging the engine clutch according to the intention of the driver operating the accelerator pedal and the brake pedal, the load, the vehicle speed, the state of charge (SOC) of the battery, and so on.

It is possible to ensure drivability of the hybrid electric vehicle by engaging the engine clutch after the engine speed and the motor speed are synchronized to maintain a constant torque during power transmission between the engine and the motor, when changing from the EV mode to the HEV mode. In order to do so, it is helpful to precisely control the engine clutch.

The delivery torque of the engine clutch, which is torque, or load at both ends of the engine clutch, transmitted by physical contact between the friction surfaces of both ends of the engine clutch, can be estimated from the efficient pressure and the friction coefficient.

Controlling the engine clutch is a very important factor that determines the drivability and the fuel consumption in starting the hybrid electric vehicle. However, the friction coefficient changes with a deviation in current and pressure characteristics of a solenoid valve operating the engine clutch, aging of the solenoid valve, and degradation of the friction members at both ends of the engine clutch, which may generate characteristic deviations.

As described above, it is difficult to precisely control the engine clutch, because characteristic deviations of the engine clutch are generated, thereby decreasing drivability and fuel consumption. Therefore, it would be beneficial if the characteristic deviation of the engine clutch is compensated or corrected through learning of an engine clutch delivery torque.

A conventional method of learning engine clutch delivery torque is performed mostly in a low hydraulic pressure region of an engine clutch to prevent a booming operation which may occur in low speed and high torque operation region of an engine, but is not performed in a high hydraulic pressure region of an engine clutch.

The above information disclosed in this Background section is only for enhancement of understanding of the background of the disclosure.

SUMMARY

The present disclosure provides a system and a method for controlling engine clutch delivery torque of a hybrid electric vehicle, which may maintain engine speed of a predetermined speed, such as, an idle speed, and control operation of an ISG so that the ISG generates engine clutch delivery torque according to a hydraulic pressure of the engine clutch when the engine clutch delivery torque is learned, so that engine booming does not occur in a low speed high torque operation region and noise, vibration, and harshness (NVH) is reduced. An exemplary embodiment of the present disclosure provides a method of controlling engine clutch delivery torque of a hybrid electric vehicle which includes an ISG and an engine clutch controlling power transmission between an engine and a motor while the engine clutch delivery torque is being learned, the method including: determining when a state of a transmission of the hybrid electric vehicle satisfies a learning condition of the engine clutch delivery torque; controlling speed of the engine to a predetermined engine target speed, and controlling speed of the motor to a predetermined motor target speed, respectively, wherein the predetermined engine target speed and the predetermined motor target speed are different from each other, when the learning condition of the engine clutch delivery torque is satisfied; detecting a speed change and a torque change of the engine and the motor, respectively, while supplying a hydraulic pressure to the engine clutch; and operating the ISG, when the detected speed change of the engine is equal to or greater than a predetermined value, in order for the predetermined engine target speed to be maintained by compensating the speed change of the engine.

The predetermined engine target speed may be an idle speed.

The ISG may be operated when a change ratio of the idle speed of the engine is equal to or greater than 10%.

The predetermined value compared with the speed change of the engine to operate the ISG may be varied according to engine displacement.

The predetermined value compared with the speed change of the engine may be proportional to engine displacement. Another exemplary embodiment of the present disclosure provides a system for controlling engine clutch delivery torque of a hybrid electric vehicle, the system including: an engine clutch configured to control power transmission between an engine and a motor; an ISG configured to start the engine or to generate electric power by output of the engine; a transmission configured to change power applied to wheels; and a controller configured to control the engine, the motor, the ISG, and the engine clutch in a predetermined condition and to check their states under the predetermined condition, wherein the controller is operated by a predetermined program. The predetermined program includes a series of commands for performing a method comprising: determining whether a state of a transmission of the hybrid electric vehicle satisfies a learning condition of the engine clutch delivery torque; controlling speed of the engine to a predetermined engine target speed, and controlling speed of the motor to a predetermined motor target speed, wherein the predetermined engine target speed and the predetermined motor target speed are different from each other, when the learning condition of the engine clutch delivery torque is satisfied; detecting a speed change and a torque change of the engine and the motor, respectively, while supplying a hydraulic pressure to the engine clutch; and operating the ISG, when the detected speed change of the engine is equal to or greater than a predetermined value, in order for the predetermined engine target speed to be maintained by compensating the speed change of the engine.

Yet another exemplary embodiment of the present disclosure provides a system for controlling engine clutch delivery torque of a hybrid electric vehicle while an engine clutch delivery torque is being learned, the system comprising: an engine clutch configured to control power transmission between an engine and a motor; an ISG configured to start the engine or to generate electric power by output of the engine; a transmission configured to change power applied to wheels; and a controller configured to control the engine, the motor, the ISG, and the engine clutch in a predetermined condition and to check their states under the predetermined condition, wherein while learning the engine clutch delivery torque, the controller operates and controls the ISG in order for the engine to maintain an idle speed when the idle speed is varied above a predetermined value.

As described above, the present disclosure may prevent an engine booming occurrence in a low speed high torque operation region and enhance NVH, by maintaining speed of an engine at a predetermined target speed, such as an idle speed, and controlling an ISG to generate the engine clutch delivery torque according to a hydraulic pressure of the engine clutch when the engine clutch delivery torque is learned.

DETAILED DESCRIPTION

Figure 1:
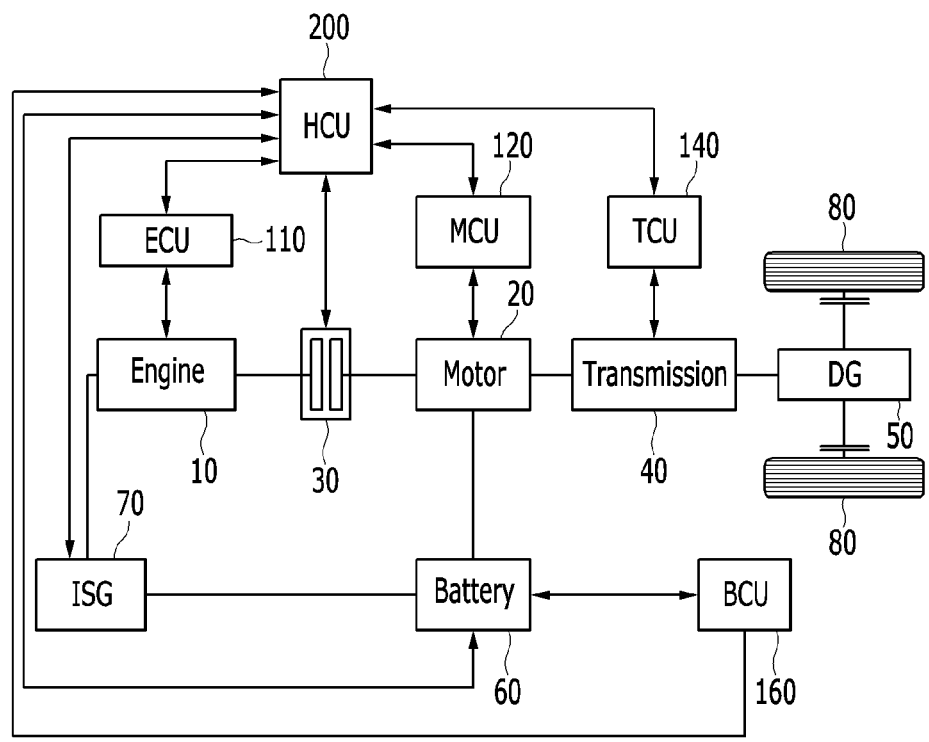
FIG. 1 is an exemplary block diagram conceptually illustrating a configuration of a hybrid electric vehicle.

Hereinafter, the present disclosure will be described more fully with reference to the accompanying drawings, in which exemplary embodiments of the disclosure are shown. The described embodiments may be modified in various different ways, all without departing from the spirit or scope of the present disclosure.

Further, throughout the specification, like reference numerals refer to like elements.

FIG. 1 is an exemplary diagram schematically illustrating a hybrid electric vehicle to which a system for controlling engine clutch delivery torque according to an exemplary embodiment of the present disclosure is applied.

As shown in FIG. 1, a hybrid electric vehicle may generally include: an engine 10; a motor 20; an engine clutch 30 configured to control power between the engine 10 and the motor 20; a transmission 40; a differential gear unit 50; a battery 60; and a ISG 70 configured to start the engine 10 or to generate electric power by output of the engine 10.

The hybrid electric vehicle may also include: a HCU 200 configured to control overall operation of the hybrid electric vehicle; an ECU 110 configured to control operation of the engine 10; a MCU 120 configured to control operation of the motor 20; a TCU 140 configured to control operation of the transmission 40; and a BCU 160 configured to manage and control the battery 60.

Figure 2:
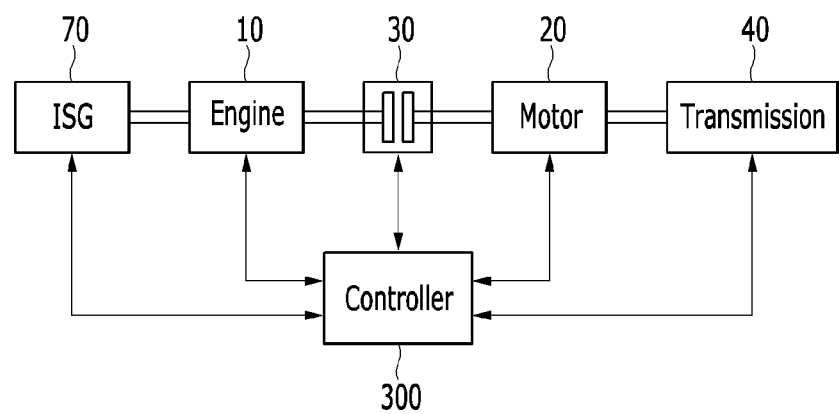
FIG. 2 is an exemplary configuration diagram illustrating a system for controlling engine clutch delivery torque of a hybrid electric vehicle according to an exemplary embodiment of the present disclosure.

FIG. 2 is an exemplary configuration diagram illustrating a system for controlling engine clutch delivery torque of a hybrid electric vehicle according to an exemplary embodiment of the present disclosure.

The system according to an exemplary embodiment of the present disclosure is a system that may control and/or learn engine clutch delivery torque of a hybrid electric vehicle.

The system for controlling engine clutch delivery torque of a hybrid electric vehicle according to an exemplary embodiment of the present disclosure, may include: the engine clutch 30 configured to control power between the engine 10 and the motor 20; the ISG 70 configured to start the engine 10 or to generate electric power by output of the engine 10; the transmission 40 configured to change power applied to wheels 80; and a controller 300 configured to perform controlling of engine clutch delivery torque through controlling the engine 10, the motor 20, the ISG 70, and the engine clutch 30 in a predetermined condition and checking their states under the predetermined condition.

Figure 3:
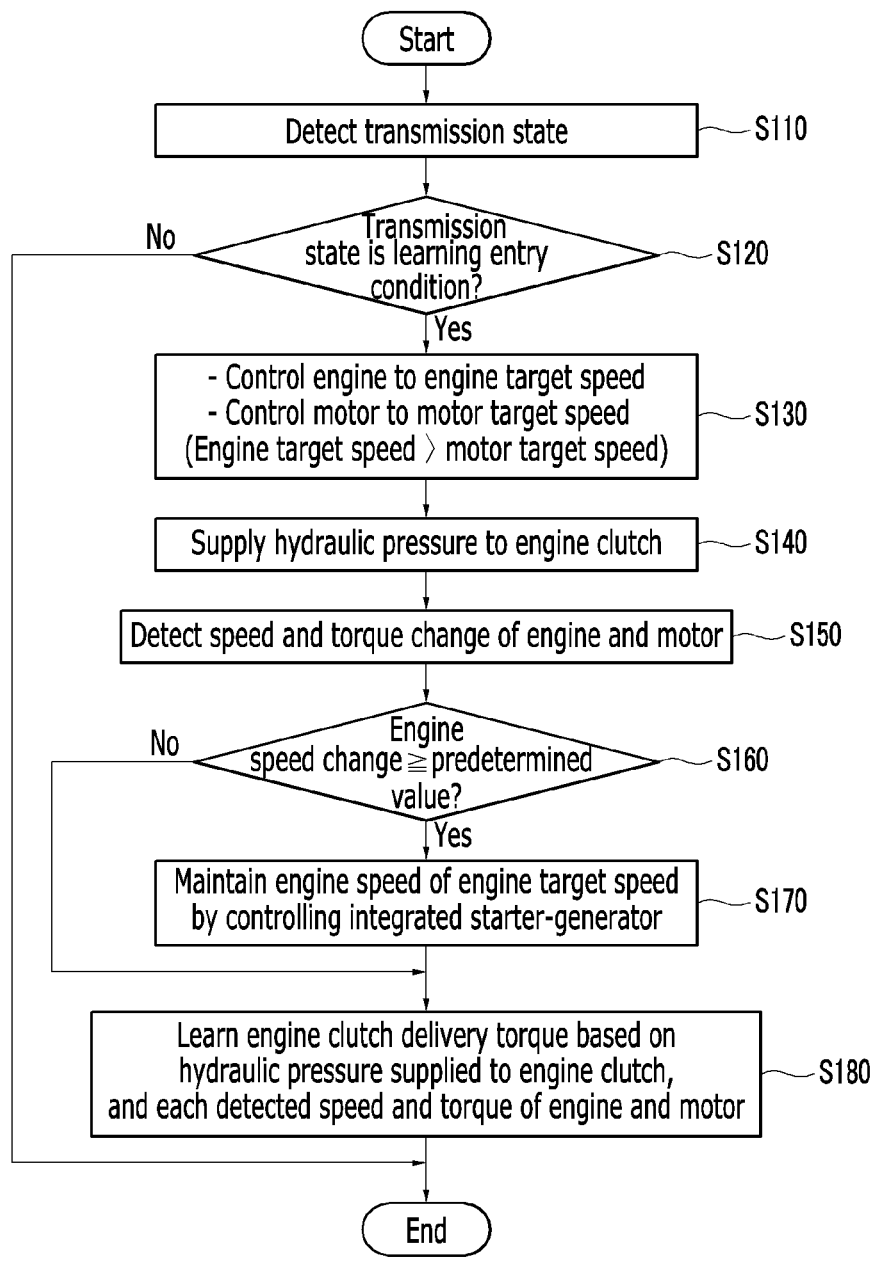
FIG. 3 is an exemplary flowchart illustrating a method of controlling engine clutch delivery torque of a hybrid electric vehicle according to an exemplary embodiment of the present disclosure.

The controller 300 may include one or more processors or microprocessors and/or hardware operated by a program including a series of commands for executing processes of the flowchart illustrated in FIG. 3.

In the exemplary embodiment of the present disclosure, the controller 300 may include: the ECU 110 configured to control the overall operation of the engine 10; the MCU 120 configured to control the operation of the motor 20; the TCU 140 configured to control the operation of the transmission 40; and the HCU 200 configured to control the overall operation of the hybrid electric vehicle.

In the method of controlling the engine clutch delivery torque according to an exemplary embodiment of the present disclosure to be described below, partial processes may be executed by the ECU, and remaining processes may be executed by any one among the MCU, the TCU, and the HCU.

However, the scope of the present disclosure is not limited to a following exemplary embodiment. The controller may be implemented by being incorporated with the description of an exemplary embodiment of the present disclosure. Further, the ECU, the MCU, the TCU, and the HCU may perform a different combination of processes than those described in the exemplary embodiment.

Hereinafter, a method of controlling engine clutch delivery torque according to an exemplary embodiment of the present disclosure is described in detail with reference to the accompanying drawings.

FIG. 3 is an exemplary flowchart illustrating a method of controlling engine clutch delivery torque of a hybrid electric vehicle according to an exemplary embodiment of the present disclosure.

As shown in FIG. 3, the controller 300 determines whether a state of the transmission 40 of the hybrid electric vehicle satisfies a learning condition of the engine clutch delivery torque (S110 and S120).

The controller 300 may detect the state of the transmission 40 through an inhibitor switch.

When the state of the transmission 40 is a neutral state (N range) or a parking state (P range), the controller 300 enters a learning mode.

When the state of the transmission 40 is the N range or the P range, whether the controller 300 starts the learning mode does not influence running of the hybrid electric vehicle.

As starting the learning mode, the controller 300 operates and controls the engine 10 and the motor 20 like a method of learning the engine clutch delivery torque according to the related art.

In particular, the controller 300 may operate the engine 10 at an idle speed of around 1300 RPM, and the motor 20 at around 1000 RPM which is slower than the speed of the engine 10.

When each of the engine 10 and motor 20 reaches a predetermined target speed, the controller 300 supplies hydraulic pressure to the engine clutch 30 (S140).

As the hydraulic pressure is supplied to the engine clutch 30, load of as much as delivery torque (T_clutch) of the engine clutch 30 is applied to the engine 10, and force which increases speed by as much as the delivery torque (T_clutch) is applied to the motor 20.

Contents described above may be expressed as in the following equation.

In the following equation, T_eng represents engine torque, T_speedcontrol represents torque needed in order to maintain the idle speed of the engine 10 in the no-load state, and T_mot represents motor torque.

$$T\_eng = T\_speedcontrol + T\_clutch$$

$$T\_mot = T\_speedcontrol - T\_clutch$$

As the hydraulic pressure supplied to the engine clutch 30 is increased, the T_clutch value increases, and the load of the engine 10 increases. In this case, when the engine 10 is in the idle state at which speed of the engine is low, it is necessary for the T_eng value to increase.

In the idle state of the engine 10, as the T_eng value is increased, the NVH performance of the engine 10 decreases due to a characteristic of the engine 10, and a booming action may occur.

Therefore, a method for controlling and/or learning the engine clutch delivery torque in the related art is performed mostly in the hydraulic pressure range which the makes the T_clutch value small.

Figure 4:
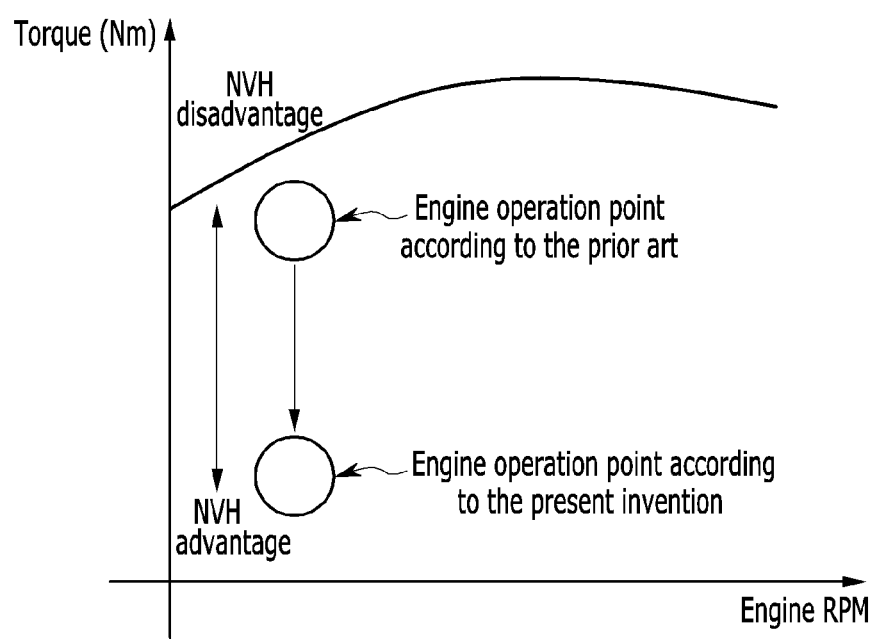
FIG. 4 is a graph illustrating a correlation between a driving point of an engine and NVH.

As shown in FIG. 4, the booming action occurs when the driving point of the engine is in a low speed and high torque range.

Accordingly, it is necessary to change the driving point of the engine to a low speed and low torque range, as shown in FIG. 4, to prevent the booming action.

To prevent the booming action, the exemplary embodiment of the present disclosure moves the driving point of the engine to the low speed and low torque range of the engine through controlling the ISG 70.

In particular, as the controller 300 supplies the hydraulic pressure to the engine clutch 30, the controller 300 detects the speed change and torque change of the engine 10 and motor 20, respectively (S150).

After detecting the speed change and torque change of the engine 10 and motor 20 while supplying the hydraulic pressure to the engine clutch 30, the controller 300 determines whether the speed change of the engine 10 is equal to and greater than a predetermined value (S160).

If the speed change of the engine 10 is equal to and greater than the predetermined value, the controller 300 controls the operation of the ISG 70 so that the ISG 70 generates the increased delivery torque of the T_clutch value which causes the speed change (S170). In some embodiments, the predetermined value of the speed change ratio of the engine 10 may be above 10%.

That is, the controller 300 controls the operation of the ISG 70 for the engine 10 to maintain the predetermined engine target speed. For example, the predetermined engine target speed may be idle speed.

Then, while controlling the operation of the ISG 70 so that the engine 10 may maintain, for example, the target idle speed, the controller 300 may continually perform the learning of the engine clutch delivery torque based on the hydraulic pressure supplied to the engine clutch 30 and the detected speed and torque of the engine 10 and motor 20 (S180).

In the S180 operation, the controller 300 may perform the learning of the engine clutch delivery torque based on the hydraulic pressure supplied to the engine clutch 30 and the detected speed and torque of the engine 10 and motor 20 according to the related art.

Accordingly, the system and method for learning the engine clutch delivery torque of the hybrid electric vehicle according to an exemplary embodiment of the present disclosure may charge the ISG with engine clutch delivery torque according to hydraulic pressure of the engine clutch, when the engine clutch delivery torque is learned, to maintain the speed of the engine at the predetermined speed, such as the idle speed.

While this disclosure has been described in connection with what is presently considered to be exemplary embodiments, it is to be understood that the disclosure is not limited to the disclosed embodiments, but, on the contrary, is intended to cover various modifications and equivalent arrangements included within the spirit and scope of the accompanying claims.

What is claimed is:

1. A method of controlling engine clutch delivery torque of a hybrid electric vehicle which includes an integrated starter-generator (ISG) and an engine clutch controlling power transmission between an engine and a motor while the engine clutch delivery torque is being learned, the method comprising:
- determining whether a state of a transmission of the hybrid electric vehicle satisfies a learning condition of the engine clutch delivery torque;
- controlling speed of the engine to a predetermined engine target speed, and controlling speed of the motor to a predetermined motor target speed, wherein the predetermined engine target speed and the predetermined motor target speed are different from each other, when the learning condition of the engine clutch delivery torque is satisfied;
- detecting a speed change and a torque change of the engine and the motor, respectively, while supplying a hydraulic pressure to the engine clutch; and
- operating the ISG, when the detected speed change of the engine is equal to or greater than a predetermined value, in order for the predetermined engine target speed to be maintained by compensating the speed change of the engine.

2. The method of claim 1, wherein the predetermined engine target speed is an idle speed.

3. The method of claim 2, wherein the ISG is operated when a change ratio of the idle speed of the engine is equal to or greater than 10%.

4. A system for controlling engine clutch delivery torque of a hybrid electric vehicle, the system comprising:
- an engine clutch configured to control power transmission between an engine and a motor;
- an integrated starter-generator (ISG) configured to start the engine or to generate electric power by output of the engine;
- a transmission configured to change power applied to wheels; and
- a controller configured to control the engine, the motor, the ISG, and the engine clutch in a predetermined condition and to check their states under the predetermined condition, wherein the controller is configured to:
- determine whether a state of a transmission of the hybrid electric vehicle satisfies a learning condition of the engine clutch delivery torque;
- control speed of the engine to a predetermined engine target speed, and control speed of the motor to a predetermined motor target speed, wherein the predetermined engine target speed and the predetermined motor target speed are different from each other, when the learning condition of the engine clutch delivery torque is satisfied;
- detect a speed change and a torque change of the engine and the motor, respectively, while supplying a hydraulic pressure to the engine clutch; and
- operate the ISG, when the detected speed change of the engine is equal to or greater than a predetermined value, in order for the predetermined engine target speed to be maintained by compensating the speed change of the engine.

* * * * *